United States Patent [19]

Norcross et al.

[11] Patent Number: 5,553,244
[45] Date of Patent: Sep. 3, 1996

[54] REFLEXIVELY SIZING MEMORY BUS INTERFACE

[75] Inventors: Thomas M. Norcross; William V. Miller, both of Arlington, Tex.

[73] Assignee: National Semiconductor Corporation, Santa Clara, Calif.

[21] Appl. No.: 387,964

[22] Filed: Feb. 10, 1995

Related U.S. Application Data

[63] Continuation of Ser. No. 975,765, Nov. 13, 1992, abandoned.

[51] Int. Cl.$^6$ ..................................................... G06F 13/00
[52] U.S. Cl. .......................... 395/280; 395/307; 395/880; 395/882; 395/886; 364/DIG. 1
[58] Field of Search .................................... 395/307, 306, 395/880, 882, 884, 886, 280

[56] References Cited

U.S. PATENT DOCUMENTS

| | | | |
|---|---|---|---|
| 4,144,562 | 3/1974 | Cooper | 395/325 |
| 4,286,321 | 8/1981 | Baker et al. | 395/325 |
| 4,291,370 | 9/1981 | Charles | 395/325 |
| 4,309,754 | 1/1982 | Dinwiddie et al. | 395/307 |
| 4,375,665 | 3/1983 | Schmidt | 395/325 |
| 4,447,878 | 5/1984 | Kinnie et al. | 395/325 |
| 4,455,606 | 6/1984 | Cushing et al. | 395/307 |
| 4,463,421 | 7/1984 | Laws | 395/325 |
| 4,683,534 | 7/1987 | Tietjen et al. | 395/325 |
| 4,716,527 | 12/1987 | Graciotti | 395/307 |
| 4,766,538 | 8/1988 | Miyoshi | 395/325 |
| 4,845,611 | 7/1989 | Turlakov et al. | 395/250 |
| 4,912,636 | 3/1990 | Magar et al. | 395/425 |
| 5,014,186 | 5/1991 | Chisholm | 395/275 |
| 5,113,369 | 5/1992 | Kinoshita | 395/325 |
| 5,274,763 | 12/1993 | Banks | 395/250 |
| 5,280,598 | 1/1994 | Osaki et al. | 395/425 |
| 5,333,294 | 7/1994 | Schnell | 395/425 |
| 5,335,340 | 8/1994 | Strong | 395/307 |

FOREIGN PATENT DOCUMENTS

0482589A2 4/1992 European Pat. Off. .

Primary Examiner—Ayaz R. Sheikh
Attorney, Agent, or Firm—Skjerven, Morrill, MacPherson, Franklin & Friel; Paul J. Winters; Ken J. Koestner

[57] ABSTRACT

A reflexively scaling memory bus interface system and method allows the implementation of an ISA bus peripheral card that will effectively operate within the decoded memory space of another sixteen bit card while using only the external memory components required for an eight bit interface. The same peripheral card will also be compatible in a system with other eight bit cards located in a corresponding memory space. The reflexively sizing memory bus interface responds automatically to memory accesses that vary in data bus width (i.e., eight or sixteen bits) by directly or indirectly monitoring feedback signals from other devices on the bus. This technique solves the problem of integrating eight and sixteen bit cards on the ISA bus.

46 Claims, 5 Drawing Sheets

REFLEXIVELY SIZING MEMORY BUS INTERFACE

This application is a continuation of application Ser. No. 07/975,765, filed Nov. 13, 1992, now abandoned.

BACKGROUND OF THE INVENTION

1. Field of the Invention

This invention relates to computer systems and, more particularly, to memory bus interfaces that accommodate data transfers between a motherboard and peripheral boards.

2. Description of the Relevant Art

A variety of peripheral boards are available for personal computer systems that expand the memory and functionality of the motherboard. Such peripherals include disk controller boards, video graphics array (VGA) boards, network interface boards and sound boards.

Each peripheral board is equipped with a connector portion that is insertable into one of a plurality of expansion slots of the PC motherboard. The expansion slots provide internal connections to a peripheral bus incorporated on the motherboard. The peripheral bus as well as a variety of control lines are typically interfaced to the system microprocessor bus via a bus control unit.

The number of bytes accessed by or from a particular peripheral board in a single transfer cycle depends upon the functionality and constraints of the circuitry within the peripheral board. That is, the width of data transfers between a peripheral board and the motherboard may not be the same as the data width accommodated by the microprocessor itself, and the data transfer width of peripheral boards connected within the same system may differ from board to board. For example, although a computer system may be equipped with a microprocessor having a thirty-two bit data bus, some of the peripheral boards connected to the system may be designed to transfer only eight bits of data at a time, while still other peripheral boards within the same system may be designed to transfer sixteen bits of data at a time.

For a system to accommodate a plurality of such peripheral boards having different data widths, the bus controller and/or microprocessor must be cognizant of the data format a particular peripheral board will handle before data transfers can be completed. This is typically accomplished by means of a control signal that is generated by the peripheral board to indicate the type of data transfer it will perform.

The concept described above will be better understood from the following example. Expansion slots within 286- and 386-processor based IBM PC/AT compatible systems are connected to a peripheral bus commonly known as the industry standard architecture or ISA (pronounced eye-sah) bus. FIG. 1A is a diagram of a portion of an IBM PC/AT motherboard that incorporates five ISA bus expansion slots formed by connectors J2-J6, J8, J10-J14 and J16. FIG. 1B is an exploded view of one of the expansion slots and illustrates pin designations and numbers on the ISA bus. Other bus schemes commonly used in 286 and 386 systems are the extended industry standard architecture or EISA (pronounced e-sah) bus and IBM's microchannel architecture or MCA bus.

The ISA bus standard has the advantage that many peripheral boards have been developed for it, and competition has kept the price of such boards low. The ISA bus, however, has only sixteen data lines and twenty-four address lines, so it cannot take full advantage of the 32 bit data and address busses of the 386. This reduces the speed at which data can be transferred on the bus. Most of the ISA based 386 machines have partially solved this problem by incorporating 16 Mbytes or more of 32 bit wide memory and often a cache memory directly on the motherboard. Since this memory can be accessed directly without going through the peripheral bus, it can operate at the full speed of the 386. In these systems, the ISA bus is used only to communicate with peripherals such as disk controller boards, video graphics array boards, network interface boards, and sound boards. Since most of these boards transfer data only eight bits or sixteen bits at a time, the ISA bus limitations do not have an appreciable effect on the overall performance of the system.

The ISA environment has other associated disadvantages. Expansion cards are typically constrained to utilize a limited memory space between 640K and 1 Meg since memory below this range is reserved for operator programs. To fully utilize this limited space, expansion cards would be optimally designed to occupy consecutive address ranges of a size that directly correspond to their addressable storage locations. This is typically not the case, however, since sixteen bit peripheral cards (most VGA cards, for example) must decode the upper local bus address lines LA23–LA17 to assert the necessary data feedback signal MEMCS16 to the ISA bus controller. MEMCS16 is a data indicator signal generated by peripheral cards to indicate that the present data transfer is a one wait-state, sixteen bit memory cycle. The upper local bus address lines LA23–LA17 allow for a resolution of only 128K. Thus, even if the sixteen bit card occupies only 32K of address space, it will assert the feedback signal indicating a sixteen bit access for the entire 128K range. As a result, eight bit peripheral cards cannot reside in that 128K address space since the bus controller would perform a sixteen bit access on the eight bit card and the upper data byte would be invalid data. Hence, due to this constraint, valuable memory space can go unused.

To avoid the waste of memory space and to allow for the numerous peripheral cards that a user may desire, expansion cards must be designed to operate within the unused portion of the 128K space decoded by a sixteen bit memory mapped card since there are no other available blocks of memory (system BIOS and monochrome or graphics screen buffers often occupy the other 128K spaces). Solving this problem is difficult since designers of cards for the ISA bus do not have prior knowledge of the type of other cards that will be integrated in the system. Hence, if they design a sixteen bit card, it could cause a system with eight bit cards to fail. On the other hand, if they design an eight bit card, it could cause systems with sixteen bit cards to fail. In these situations, system integration and end user support is much more difficult and expensive. To exist in the 128K space decoded by another sixteen bit card, the card must be able to perform sixteen bit accesses. This constraint increases the cost of boards that only require an eight bit data bus, the most common example being boards that contain an eight bit BIOS ROM.

A price increase is not the only penalty the designer incurs when going to a sixteen bit interface. Another negative aspect of designing a sixteen bit interface is the fact that the board now always decodes the 128K space. This means if a user previously had only eight bit cards in his system, integration of the new card becomes the cause of the same problem described above for the remaining cards in the system. Thus, compatibility of eight bit and sixteen bit cards within the same system is often hindered.

SUMMARY OF THE INVENTION

In accordance with the present invention, a reflexively scaling memory bus interface system and method allows the implementation of an ISA bus peripheral card that will effectively operate within the decoded memory space of another sixteen bit card while using only the external memory components required for an eight bit interface. The same peripheral card will also be compatible in a system with other eight bit cards located in a corresponding memory space.

The reflexively sizing memory bus interface responds automatically to memory accesses that vary in data bus width (i.e., eight or sixteen bits) by directly or indirectly monitoring feedback signals from other devices on the bus. A fundamental principal of the approach is that an ISA card's memory interface data bus width does not have to be predefined and can be dynamically determined by other cards on the bus. This technique solves the problem described above of integrating eight and sixteen bit cards on the ISA bus. If the reflexively sizing memory interface technique is used, a single peripheral board may be designed for use in systems having either eight bit or sixteen bit cards and compatibility conflicts will not be created. In addition, the reflexively scaling interface is cost effective since it only requires an eight bit interface to the card's memory components (RAMs, ROMS, etc.) regardless of whether eight or sixteen bit accesses are performed.

These and other advantages are achieved with the present invention, in accordance with which a memory bus interface is provided for a first peripheral board that is connectable to an expansion slot of a computer motherboard. The expansion slot connects a peripheral data bus to the first peripheral board and the first peripheral board includes a peripheral circuit for performing a predetermined peripheral function. The memory bus interface includes a buffer circuit for selectively coupling data between a plurality of data lines of the peripheral circuit and a first set of lines of the peripheral data bus. A data storage element is provided for selectively coupling data between the plurality of data lines of the peripheral circuit and a second set of lines of the peripheral data bus. The memory bus interface further includes a data format controller coupled to receive a data feedback signal indicative of a data width format of a second peripheral board connectable to the computer motherboard. The data format controller provides control signals to the buffer circuit and to the data storage element when a memory access to the peripheral circuit is initiated such that data is provided to the peripheral data bus in the same width format as the data width format of the second peripheral board.

In accordance with a further aspect of the invention, a method is provided for interfacing a peripheral board with a computer motherboard. The peripheral board is connectable to a peripheral data bus of the computer motherboard and includes a peripheral circuit for performing a predetermined peripheral function. The method includes the steps of monitoring a data feedback signal indicative of a data width format of other peripheral boards connectable to the computer motherboard. If the data feedback signal indicates a first data width format, a first data byte is provided to the peripheral circuit from a first set of lines of the peripheral data bus. If the data feedback signal indicates a second data width format, the method includes the steps of storing a second data byte provided at a second set of lines of the peripheral data bus in a storage element, providing a third data byte provided at the first set of lines of the peripheral data bus to the peripheral circuit, and providing the second data byte stored in the storage element to the peripheral circuit.

In accordance with still another aspect of the invention, a method is provided that includes the steps of monitoring a data feedback signal indicative of a data width format of other peripheral boards connectable to the computer motherboard. If the data feedback signal indicates a first data width format, a first data byte is provided to a first set of lines of the peripheral data bus from the peripheral circuit. If the data feedback signal indicates a second data width format, the method includes the steps of storing a second data byte from the peripheral circuit in a storage element, providing a third data byte to the first set of lines of the peripheral data bus from the peripheral circuit, and providing the second data byte stored in the storage element to a second set of lines of the peripheral data bus at the same time when the third data byte is provided to the first set of lines of the peripheral data bus.

The invention will be more readily understood with reference to the drawings and the detailed description. As will be appreciated by one skilled in the art, the invention is applicable to memory bus interfaces in general and is not limited to the specific embodiments disclosed.

DETAILED DESCRIPTION

The following includes a detailed description of the best presently contemplated mode for carrying out the invention. The description is intended to be merely illustrative of the invention and should not be taken in a limiting sense.

Figure 1A:
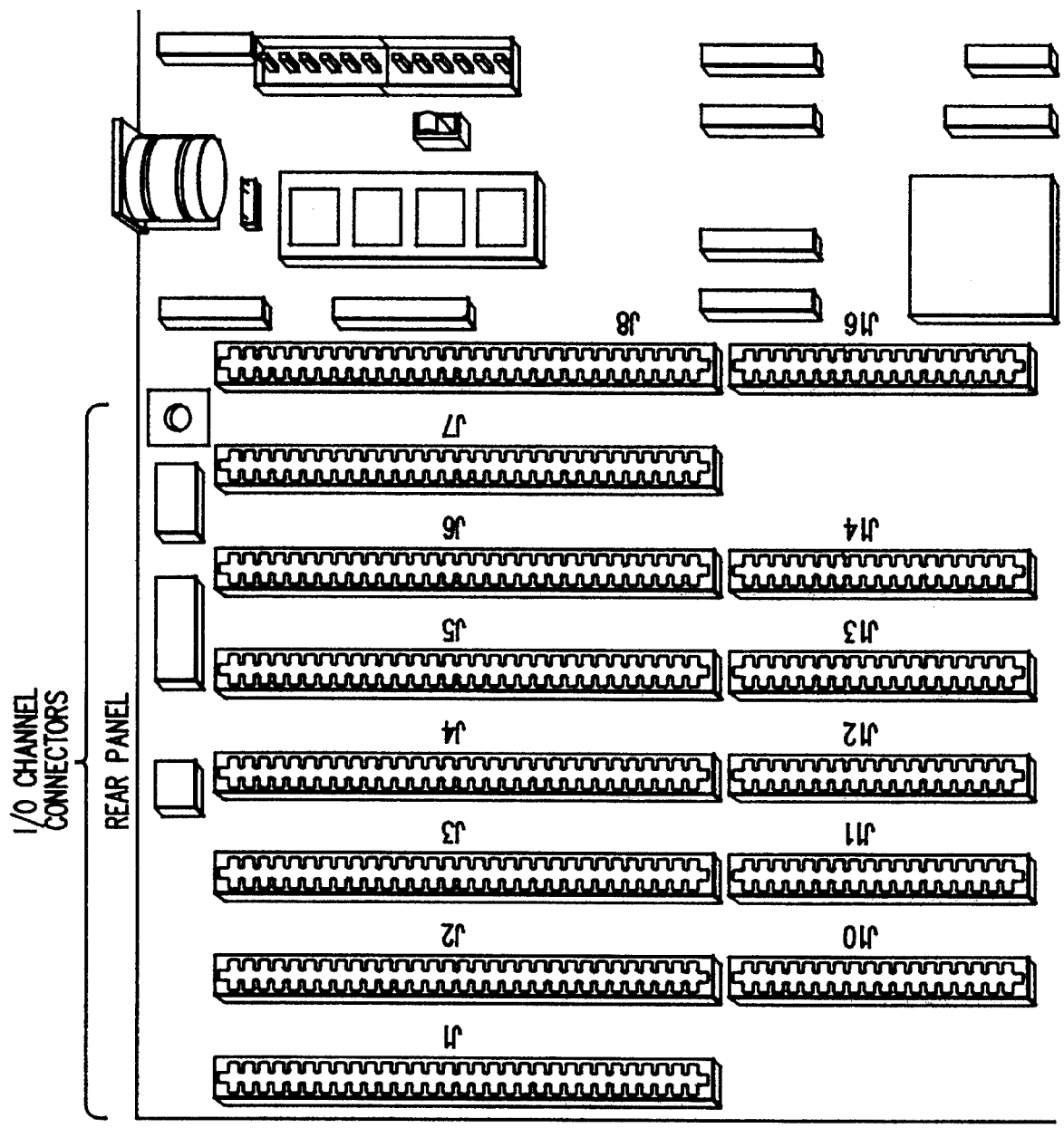
FIG. 1A is a diagram of a portion of an IBM PC/AT motherboard that incorporates five ISA bus expansion slots.
Figure 1B:
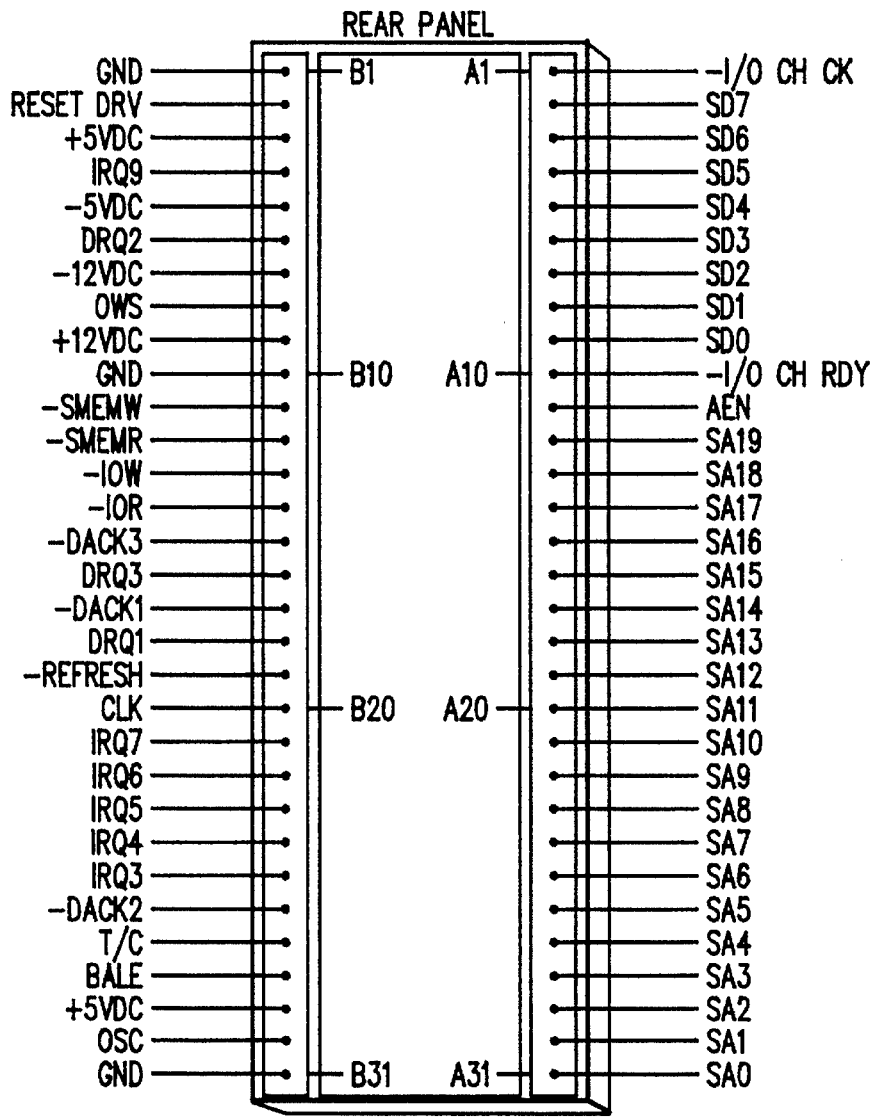
FIG. 1B is an exploded view of one of the expansion slots and illustrates pin designations and numbers on the ISA bus.
Figure 1B:
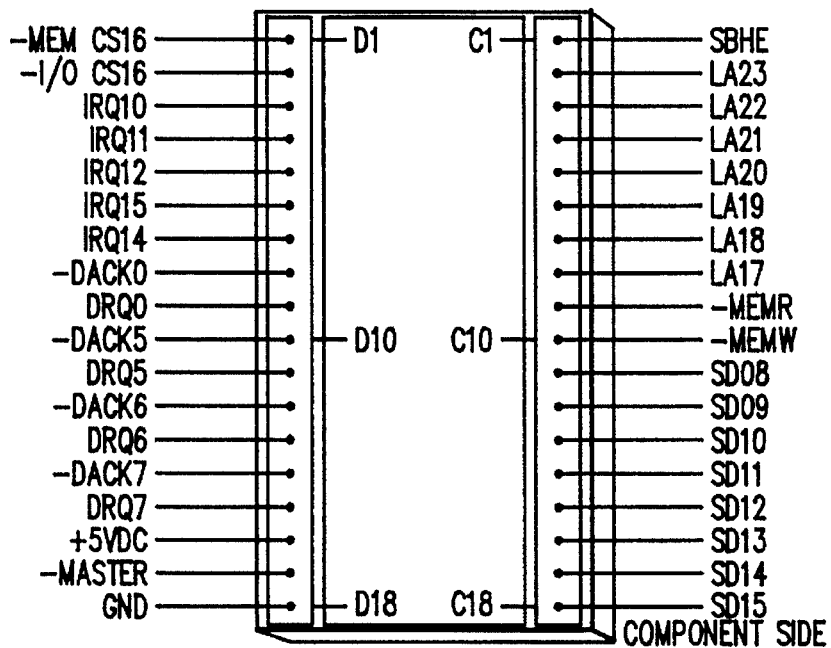
Figure 2:
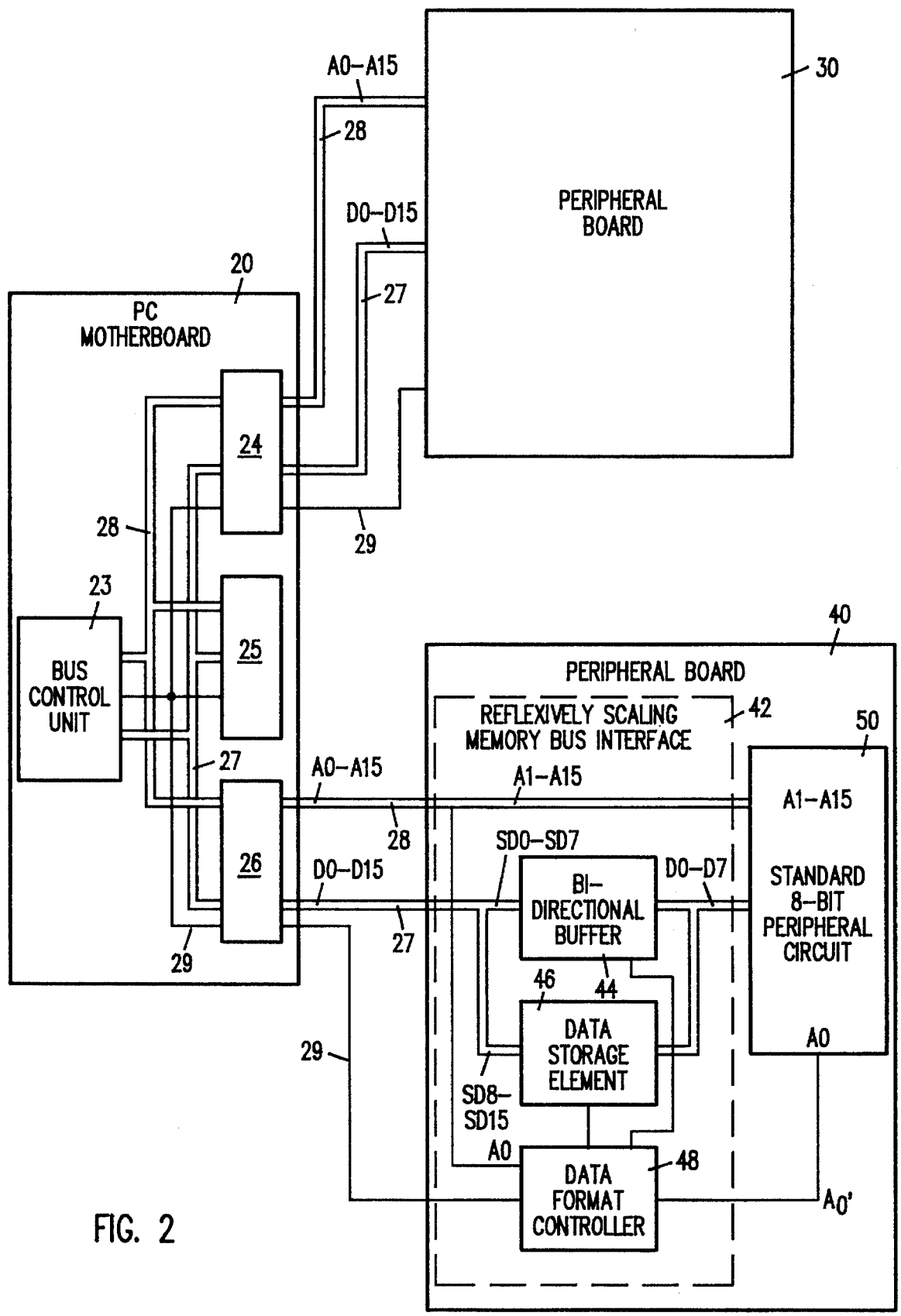
FIG. 2 is a block diagram of a computer system incorporating a reflexively scaling memory bus interface in accordance with the present invention.

Referring to FIG. 2, a block diagram is shown of a computer system that incorporates a reflexively scaling memory bus interface in accordance with the present invention. The system includes a PC motherboard 20 having a plurality of peripheral expansion slots 24–26 for expanding the memory and functionality of the motherboard 20. Peripheral expansion slots 24–26 include receptacles that electrically connect a peripheral data bus 27, a peripheral address bus 28 and various control lines 29 to interchangeable peripheral boards received within the receptacles. The peripheral data and address busses 27 and 28 are also shown coupled to a bus control unit 23 mounted on motherboard 20.

The system of FIG. 2 is exemplified with a first peripheral board 30 received at expansion slot 24 and a second peripheral board 40 received at expansion slot 26. Peripheral board 30 is representative of a conventionally available expansion board such as a disk controller board, a video graphics array board or a network interface board. A line among control lines 29 is connected to peripheral board 30 and allows propagation of a data feedback signal from peripheral board 30 to bus control unit 23. The data feedback signal is generated at a predetermined time during an access to peripheral board 30 and indicates the type of data transfer to occur. For example, depending upon the characteristics of the peripheral board connected to expansion slot 24, either eight or sixteen bit data transfers may occur. The bus control unit 23 must be able to discriminate between the possible types of data transfers for proper operation. A conventional way of achieving this is to design the motherboard such that the bus control unit 23 will anticipate a sixteen bit transfer, for example, when the data indicator signal is asserted, and will anticipate an eight bit transfer when the data indicator signal is not asserted. Thus, if a read or a write operation is executed with respect to a location mapped within the memory space of peripheral board 30, peripheral board 30 will respond by asserting the data feedback signal if it performs sixteen bit transfers. The bus control unit 23 receives this signal and responsively coordinates with the remainder of the system to perform a sixteen bit transfer. On the other hand, if the peripheral board 30 does not assert the data feedback signal, the bus control unit 23 coordinates an eight bit transfer. In these systems, the data feedback signal is typically generated by decoding selected lines of the address bus.

Peripheral board 40 is connected to expansion slot 26 of the PC motherboard 20. Peripheral board 40 includes a reflexively scaling memory bus interface 42 such that the board will be compatible with other peripheral boards regardless of their respective data transfer formats (i.e., eight bit or sixteen bit). The reflexively scaling memory bus interface 42 is interfaced between the expansion slot 26 and a standard eight bit peripheral circuit 50. The standard eight bit peripheral circuit 50 may be similar or identical to the circuitry within conventionally available boards and may perform one of a variety of functions, such as that of a disk controller board, a video graphics array board or a network interface board.

The reflexively scaling memory bus interface 42 includes a bi-directional buffer 44 having tri-state output lines, a bi-directional data storage element 46 also having tri-state output lines, and a data format controller 48. The data format controller 48 directly or indirectly monitors the data feedback signals generated by other peripheral boards within the system and controls the buffer 44 and data storage element 46 such that data is provided to and received from the peripheral data bus 27 in a bit-width format consistent with the data feedback signals.

For example, consider an ISA bus system where the peripheral board 30 is either an eight bit or a sixteen bit board, the specific type being dependent upon the particular board integrated by the user. As explained previously, this peripheral board will either assert the data feedback signal MEMCS16 if it operates with a sixteen bit format or will not assert the data feedback signal MEMCS16 if it operates with an eight bit format. Also by system design, the data indicator signal MEMCS16 must be asserted from the decode of selected bits (i.e., LA17–LA23) of the peripheral address bus. If these decoded address bits also correspond to memory space to which peripheral board 40 is mapped (in addition to the memory space to which peripheral board 30 is mapped), then any access to peripheral board 40 will result in assertion of the MEMCS16 data feedback signal by peripheral board 30 (provided it is a sixteen bit board). As explained previously, this situation will create compatibility conflicts for conventional eight bit peripheral boards.

A fundamental principal of the present invention is that the memory interface bus width does not have to be predefined and can be dynamically determined by responses from other boards on the bus. For an ISA bus peripheral board, the reflexively scaling interface may be used to map the peripheral board 40 in the same 128K address range that a sixteen bit card decodes to assert data feedback signal MEMCS16. The memory access could be a sixteen bit access, an eight bit odd byte access, or an eight bit even byte access. Once the type of access is determined by the data format controller 48, the reflexively sizing memory bus interface presents the data in that format. Presenting sixteen bit data with only eight bit memory components is accomplished by local control of the low order address bit and an internal latching function. If the system performs an access to peripheral board 40 and the other peripheral board 30 asserts the MEMCS16 signal, peripheral board 40 formats the data in sixteen bit transfers. If, on the other hand, peripheral board 40 is in a system with only eight bit cards (and thus signal MEMCS16 would not be asserted when an access occurs), peripheral board 40 formats the data in eight bit transfers. Since peripheral board 40 does not always have to respond with sixteen bit transfers, the board does not create compatibility problems for other eight bit boards mapped within the same 128K address space.

Specific operational details of the reflexively scaling memory bus interface 42 as shown in FIG. 2 are next considered. If a memory read or write cycle is initiated by motherboard 20 to an address mapped within peripheral board 40, the data format controller 48 will respond differently depending upon whether a data feedback signal was asserted by peripheral board 30. For the situation where the data feedback signal is asserted, motherboard 20 will anticipate a sixteen bit data transfer. On the other hand, for the situation where the data indicator signal is not asserted, motherboard 20 will anticipate an eight bit data transfer. Depending upon the type of data transfer, data format controller 48 controls the generation and sequencing of control signals provided to buffer 44 and data storage element 46. In addition, data format controller 48 further controls the low order local address signal $A_0'$ of peripheral circuit 50. This operation will be better understood from the following discussion.

Consider first the situation where peripheral board 30 is a sixteen bit board residing in a 128K decoded address space to which peripheral board 40 is mapped. In this case, the data feedback signal will be asserted whenever an access to peripheral board 40 is initiated. During a read cycle, motherboard 20 will anticipate a sixteen bit data word at lines D0–D15 of data bus 27. To provide the proper data type, data format controller 48 identifies that the read operation is associated with memory mapped within peripheral board 40 by monitoring a read strobe line and decoding the addressing signal on address bus 28. Upon identification of an associated read request, data format controller 48 drives the low order local address signal $A_0'$ high such that the upper data byte of the requested sixteen bit data word is provided from peripheral circuit 50. It is noted that upper bit address lines from peripheral address bus 28 are received directly by peripheral circuit 50. When the upper data byte is provided from peripheral circuit 50, data format controller 48 generates a signal to latch the data within data storage element 46. This data is driven to data lines D8–D15. During a subsequent clock cycle of data format controller 48, the local address signal $A_0'$ is driven low and transceiver 44 is activated to provide the low data byte to data lines D0–D7. A valid sixteen bit data word is thereby provided to the peripheral data bus of motherboard 20.

Similarly, during a memory write cycle, data format controller 48 responds by latching the upper data byte from data bus 27 into data storage element 46. At approximately the same time, buffer 44 is enabled to provide the low data byte to peripheral circuit 50. Also about this time, address bit $A_0'$ is driven low such that the low data byte can be written into peripheral circuit 50. It is noted that when this occurs, the output of data storage element 46 is disabled and tri-stated. During the next clock cycle of data format controller 48, the buffer 44 is disabled and the output of data storage element 46 is enabled to provide the upper data byte to peripheral circuit 50. Also during this clock cycle, address bit $A_0'$ to peripheral circuit 50 is driven high. The sixteen bit write cycle is thereby completed.

From the foregoing, it is evident that both sixteen bit read and write cycles can be performed upon peripheral board 40 as a result of the reflexively scaling memory bus interface 42. It is noted that a variety of methods could be employed to coordinate the data transfers between the motherboard 20 and peripheral board 40. For example, the data format controller 48 could generate a wait-state signal to delay the write or read cycle of motherboard 20 while the reflexively scaling memory bus interface 42 provides or receives data on the peripheral data bus 27. A variety of specific control schemes could be implemented without departing from the spirit in scope of the present invention.

Consider next the situation where peripheral board 30 is an eight bit board. In this case, the data feedback signal will not be asserted when access to peripheral board 40 is initiated. During an odd-byte read cycle, data format controller 48 responds by driving the low order local address bit $A_0'$ high, enabling buffer 44 and latching the data from peripheral circuit 50 into data storage element 46. The same data byte is thus presented to lines D0–D7 and lines D8–D15. For an even byte access, the low order address bit $A_0'$ is driven low and the output of data storage element 46 is disabled. Thus, the data is presented only to peripheral data lines D0–D7.

Similarly, during an odd-byte write cycle, the byte presented to data lines D8–D15 is latched within data storage element 46. The output of data storage element 46 is also enabled to provide the data directly to the peripheral circuit 50. For an even byte transfer, the data storage element 46 is not enabled, and instead, the buffer 44 is enabled to provide the data byte on data lines D0–D7 to peripheral circuit 50.

The implementation of the reflexively scaling memory bus interface 42 as described above involves direct monitoring of the data feedback signal from peripheral board 30 to determine the proper data format. As explained previously, in the ISA bus environment, this signal is designated MEMCS16. The reflexively scaling memory bus interface 42 could be alternatively implemented by monitoring other signals derived from or indicative of the data feedback signal generated by other peripheral boards. That is, instead of directly monitoring the data feedback signal from peripheral board 30, data format controller 48 could monitor other signals that are derived from or that are indicative of the data feedback signal. For example, in the ISA bus environment, the status signal SBHE and the low order peripheral address bit SA0 from the ISA bus can be monitored to determine the type of memory access being performed. Status signal SBHE and address bit SA0 are generated by the motherboard 20 and are indicative of the data feedback signal MEMCS16. For a sixteen bit ISA bus transfer when signal MEMCS16 is asserted, signal SBHE is asserted low while address bit SA0 is asserted low. On the other hand, during an eight bit even byte transfer when signal MEMCS16 is not asserted, signal SBHE is asserted high and address bit SA0 is asserted low. Similarly, during an eight bit odd byte transfer, signal SBHE is asserted low while address bit SA0 is asserted high. These signals can therefore be monitored through a logical OR function to provide an indirect indication of the data feedback signal MEMCS16. One reason a designer may choose to implement the reflexively scaling memory bus interface 42 in this manner (i.e., by monitoring signals SBHE and SA0 rather than signal MEMCS16) is to reduce pin count on the integrated circuit. Details of such an alternative implementation are described further below.

Figure 3:
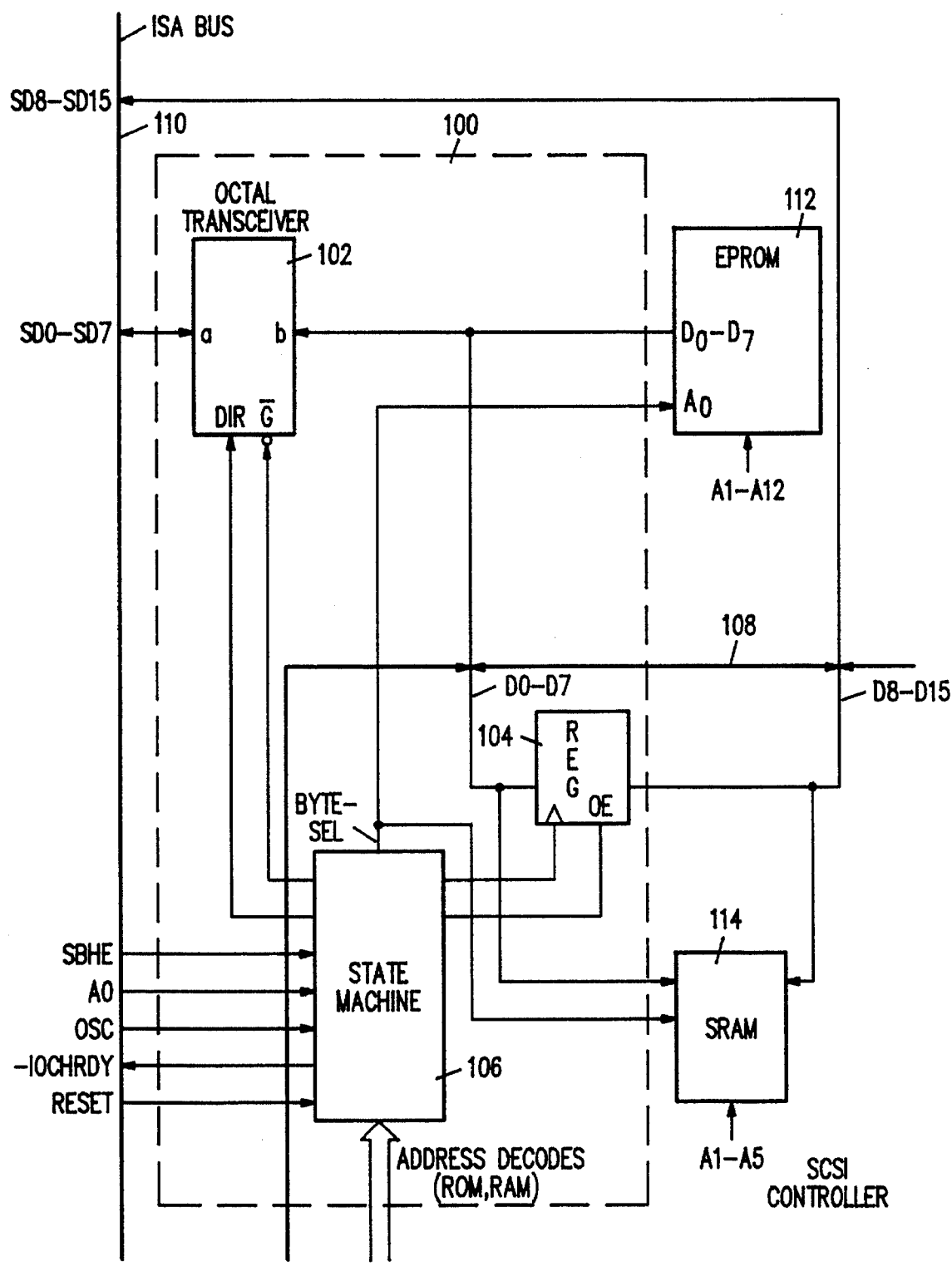
FIG. 3 is a block diagram of a SCSI controller implemented with a reflexively scaling memory bus interface in accordance with the present invention.

Referring next to FIG. 3, a reflexively scaling memory bus interface in accordance with the present invention is shown implemented within a small computer systems interface or SCSI (pronounced "skuzy") controller. In this embodiment, a reflexively scaling memory bus interface 100 includes an octal transceiver 102, a data latch 104, and a state machine 106. The reflexively scaling memory bus interface 100 is connected to an ISA bus 110 and various components of the SCSI controller. The octal transceiver 102 is a bi-directional buffer implemented using a type 245 integrated circuit, and state machine 106 performs functions similar to those of the data format controller described earlier.

The SCSI controller requires a specific BIOS that is contained in a byte wide EPROM 112. The SCSI controller also includes an internal static RAM 114 that is mapped into the ISA bus memory space. The data bus of EPROM 112 is connected to the lower eight bits of the SCSI controller's data bus 108 and to a port of octal transceiver 102. The other port of transceiver 102 is connected to the ISA bus 110 low data byte (SD0–SD7).

If a sixteen bit read access is made to the BIOS EPROM 112 or the internal static RAM 114, the reflexively scaling bus interface circuitry first deasserts the ISA bus signal IOCHRDY to extend the read cycle. The interface then accesses the high byte from EPROM 112 or RAM 114 and internally latches it within a data register 104. This is done locally by asserting the EPROM's or RAM's low order address bit $A_0$ and enabling its respective output. During this internal transfer, the octal transceiver 102 is not enabled and the high byte is latched only inside the SCSI device. On the next clock cycle, the data in data register 104 is output on the upper data byte D8–D15 of the SCSI controller's data bus 108 (the SCSI device requires a sixteen bit I/O interface so these pins are already available on the device). The upper data byte lines of the ISA bus 110 are directly connected to the upper data byte lines of the SCSI controller's data bus 108. After this, the low byte is accessed from the EPROM 112 or the RAM 114 by deasserting the lower address bit and enabling transceiver 102 thus driving the byte onto the low byte of the ISA bus 110. After valid data is presented to the ISA bus 110, IOCHRDY is deasserted and the cycle is allowed to end. The state machine 106 incorporated within the reflexively scaling bus interface 100 ensures that the EPROM and static RAM access times are met. This will be explained further below.

The eight bit accesses are subsets of the same flow. For an odd byte access, the low order address bit is asserted and the upper byte is taken from the respective memory component (i.e., the EPROM 112 or static RAM 114), latched in register 104, and driven on the upper byte of the system bus. The same upper byte is also driven on the low byte of the ISA bus 110 by enabling transceiver 102. For an even byte access, the same flow is followed as in the sixteen bit access except that the SCSI controller's upper data byte outputs are not enabled through register 104. Therefore, only the even byte is presented to the low byte of the ISA data bus. Write accesses to the internal static RAM 114 are performed using an approach similar to that described above in conjunction with FIG. 2. The same SCSI controller can also be used in an eight bit only ISA bus system. In this case, the SCSI controller's SBHE input pin is simply tied high.

The reflexively scaling bus interface technique is very valuable for ISA bus applications that require a custom BIOS on the expansion card. With this technique, an ISA bus expansion card can be designed with a single eight bit EPROM for the BIOS storage and still remain compatible with sixteen bit cards that are in the same system. This provides for much easier integration and end user support.

Figure 4:
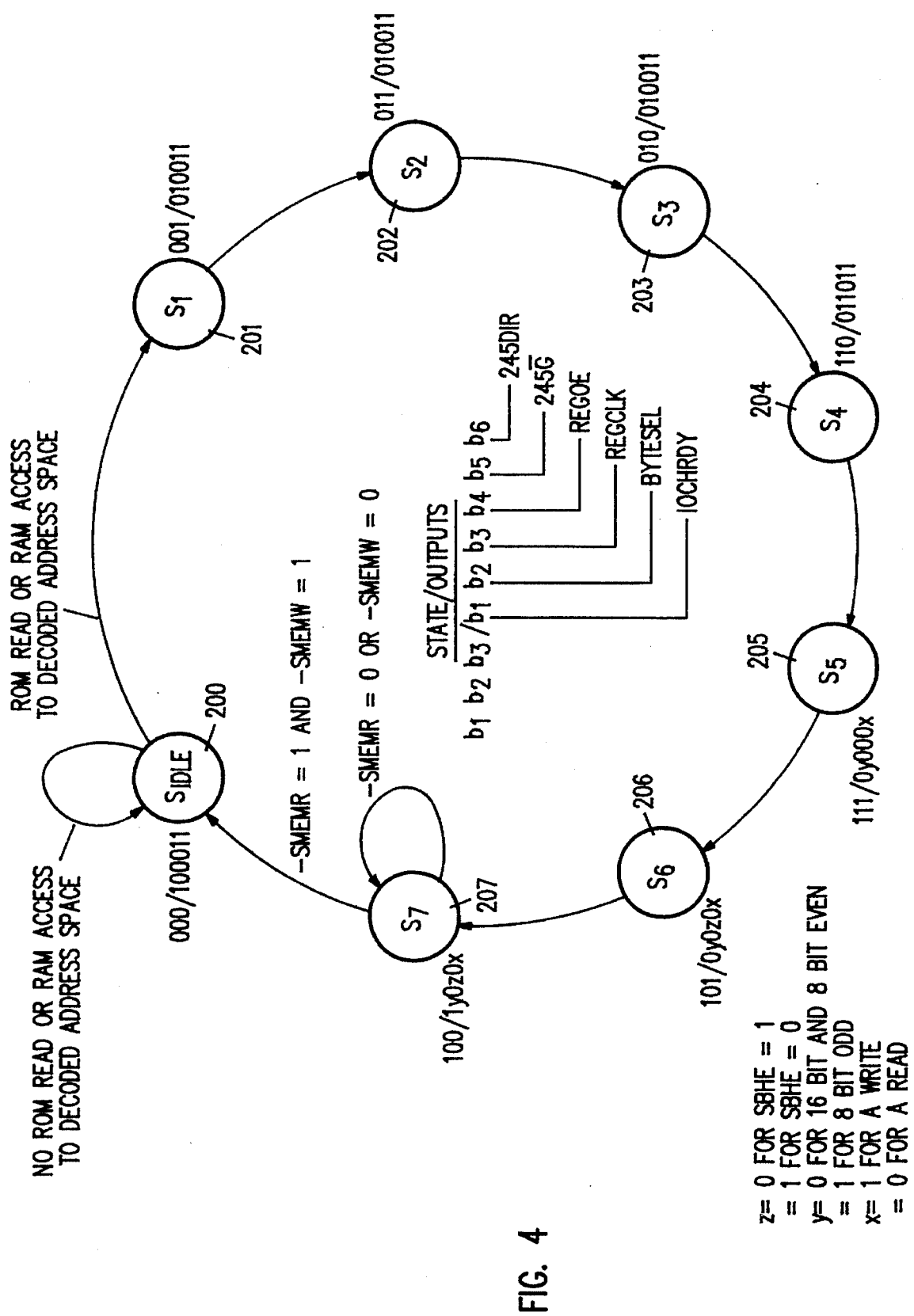
FIG. 4 is a state diagram that defines the operation of the state machine within the reflexively scaling memory bus interface of FIG. 3.

Referring finally to FIG. 4 in conjunction with FIG. 3, a state diagram is shown that defines the states of state machine 106. As shown in FIG. 4, state machine 106 has eight states 200–207. When the system is reset, the state machine defaults to an idle state 200 and remains in this state as long as no accesses are initiated to the decoded address space of peripheral board 40.

When the system requests a memory access to the decoded address space, the state machine sequences to its first active state 201. As is evident from the diagram, signal IOCHRDY is asserted low to extend the access cycle. The BYTESEL signal is asserted high and is provided to the low order address bit $A_0$ of the peripheral boards memory components. The clock signal for register 104 labeled REGCLK is low as well as the output enable of register 104. In addition, octal transceiver 102 is disabled by means of signal $245\overline{G}$.

The state machine 106 sequences to the next state on the next rising edge of the state machine clock. The output signals are held constant during states 202 and 203 to maintain proper timing. When the state machine 106 sequences to state 204, signal REGCLK is asserted to latch data into register 104. On the rising edge of the state clock, the state machine sequences to state 205 where signal REGCLK is deasserted. The BYTESEL signal is held high if the access is an eight bit odd access, and is asserted low if the access is a sixteen bit access or an eight bit even byte access. Transceiver 102 is enabled by signal $245\overline{G}$ and will transfer data in a direction determined by signal 245DIR depending upon whether the access is a write or a read operation. At state 206, the output of register 104 is enabled if signal SBHE is low and is disabled if signal SBHE is high. When the state machine completes state 207, the state machine asserts signal IOCHRDY to indicate to the system that the peripheral memory access can be performed. That is, at this point, the data has been formatted properly and the system can complete its cycle. The state machine will remain in state 207 until both signals SMEMR and SMEMW are high, indicating that the system has completed the access cycle. At this point, state machine 106 returns to its idle state 200.

It is noted that a flip flop or a circuit providing a similar function is used to monitor state 207. If both signals SMEMR and SMEMWR go high at any point during state 207, the state machine will sequence to idle state 200 regardless of the state of signals SMEMR or SMEMW are at the rising edge of the clock of the state machine. This prevents the possibility of missing the end of a system access when interfacing with extremely fast systems when back-to-back memory accesses occur.

Computer aided design or CAD tools may be used to characterize the block diagram of FIG. 3 and the state diagram of FIG. 4 to create transistor level implementations of the reflexively scaling memory bus. For example, in one embodiment of the invention, the state diagram of FIG. 4 was written in the behavioral language Verilog. The synthesis program Synopsis was then used to reduce the behavioral language to create a gate level circuit implementation.

Numerous modifications and variations will become apparent to those skilled in the art once the above disclosure is fully appreciated. For example, when the reflexively scaling memory bus interface is integrated with a peripheral board that performs only read operations or only write operations, a uni-directional buffer circuit may be provided in the place of bi-directional buffer circuit 44 and transceiver 102. It is to be understood that the above detailed description of the preferred embodiments is intended to be merely illustrative of the spirit and scope of the invention and should not be taken in a limiting sense. The scope of the claimed invention is better defined with reference to the following claims.

What is claimed is:

1. A memory bus interface on a first peripheral board that is configured to be connected to a first expansion slot of a computer motherboard having a plurality of expansion slots for connecting to a plurality of peripheral boards, the expansion slots being interfaced to a bus system having a memory address space divided into a plurality of separately-addressed sections, first peripheral board having a memory address space corresponding to a first addressed section and coupling a peripheral data bus to the first peripheral board, the memory bus interface comprising:

a buffer circuit coupled to a plurality of data lines of a peripheral circuit integral to the first peripheral board and to a first set of lines of the peripheral data bus to selectively communicate data between the plurality of data lines of the peripheral circuit and the first set of lines of the peripheral data bus;

a data storage element coupled to the plurality of data lines of the peripheral circuit and to a second set of lines of the peripheral data bus to selectively store data and communicate stored data between the plurality of data lines of the peripheral circuit and the second set of lines of the peripheral data bus; and a data format controller coupled to receive and monitor a data feedback signal generated by a peripheral board, the signal being indicative of a data width format and a memory address space of the peripheral board, wherein the data format controller provides control signals to the buffer circuit and to the data storage element when a read or write access of the peripheral circuit is initiated and the memory address space of a second periphery board is the first addressed section such that data is selectively coupled between the peripheral circuit and the peripheral data bus in the same width format as the data width format of the second peripheral board.

2. The memory bus interface as recited in claim 1 wherein the buffer circuit is a bi-directional buffer circuit.

3. The memory bus interface as recited in claim 1 wherein the buffer circuit includes tri-state output lines.

4. The memory bus interface as recited in claim 1 wherein the data storage element includes tri-state output lines.

5. The memory bus interface as recited in claim 1 wherein the data format controller provides a first control signal to the data storage element that causes the data storage element to store a first data byte provided at the plurality of data lines of the peripheral circuit during a first clock cycle of a memory read operation, and wherein the data format controller provides a second control signal to the buffer circuit that causes a second data byte provided at the plurality of data lines of the peripheral circuit to propagate to the first set of lines of the peripheral data bus during a subsequent clock cycle of the memory read operation.

6. The memory bus interface as recited in claim 5 wherein the first control signal is provided to the data storage element and wherein the second control signal is provided to the buffer circuit when the data feedback signal indicates a first data format having a width of two data bytes.

7. The memory bus interface as recited in claim 6 wherein the data format controller provides a third control signal to the buffer circuit if the data feedback signal indicates a second data format having a width of one data byte, wherein the third control signal causes a third data byte provided at the plurality of data lines of the peripheral circuit to propagate through the buffer circuit to the first set of lines of the peripheral data bus.

8. The memory bus interface as recited in claim 5 wherein the first and second data bytes are provided to the peripheral data bus during the subsequent clock cycle.

9. The memory bus interface as recited in claim 5 wherein the data format controller controls a lowest order address bit of the peripheral circuit such that the lowest order address bit has a first logical state during the first clock cycle and such that the lowest order address bit is complemented during the subsequent clock cycle.

10. The memory bus interface as recited in claim 1 wherein the data format controller controls a lowest order address bit of the peripheral circuit.

11. The memory bus interface as recited in claim 1 wherein the peripheral circuit is a small computer systems interface.

12. The memory bus interface as recited in claim 1 wherein the data format controller provides a first control signal to the data storage element that causes the data storage element to store a first data byte provided at the second set of lines of the peripheral data bus during a first clock cycle of a memory write operation, and wherein the data format controller provides a second control signal to the buffer circuit that causes a second data byte provided at the first set of lines of the peripheral data bus to propagate to the plurality of data lines of the peripheral circuit during the first clock cycle, and wherein the first data byte is provided from the data storage element to the plurality of data lines of the peripheral circuit during a subsequent clock cycle of the memory write operation.

13. The memory bus interface as recited in claim 12 wherein the first control signal is provided to the data storage element and wherein the second control signal is provided to the buffer circuit when the data feedback signal indicates a first data format having a width of two data bytes.

14. The memory bus interface as recited in claim 13 wherein the data format controller provides a third control signal to the buffer circuit if the data feedback signal indicates a second data format having a width of one data byte, wherein the third control signal causes a third data byte provided at the first set of lines of the peripheral data bus to propagate through the buffer circuit to the plurality of data lines of the peripheral circuit.

15. The memory bus interface as recited in claim 12 wherein an output of the buffer circuit is disabled during the subsequent clock cycle.

16. The memory bus interface as recited in claim 12 wherein the data format controller controls a lowest order address bit of the peripheral circuit such that the lowest order address bit has a first logical state during the first clock cycle and such that the lowest order address bit is complemented during the subsequent clock cycle.

17. A memory bus interface on a first peripheral board that is configured to be connected to a first expansion slot of a computer motherboard having a plurality of expansion slots for connecting to a plurality of peripheral boards, the expansion slots being interfaced to a bus system having a memory address space divided into a plurality of separately-addressed sections, the first peripheral board having a memory address space corresponding to a first addressed section and coupling a peripheral data bus to the first peripheral board, the memory bus interface comprising:

a buffer circuit coupled to a plurality of data lines of a peripheral circuit integral to the first peripheral board and to a first set of lines of the peripheral data bus, the buffer circuit selectively coupling data between the plurality of data lines of the peripheral circuit and the first set of lines of the peripheral data bus;

a data storage element coupled to the plurality of data lines of the peripheral circuit and to a second set of lines of the peripheral data bus, the data storage element selectively coupling data between the plurality of data lines of the peripheral circuit and the second set of lines of the peripheral data bus; and a data format controller coupled to receive and monitor a data feedback signal generated by a peripheral board, the signal being indicative of a data width format and a memory space of the peripheral board, wherein the data format controller provides control signals to the buffer circuit and to the data storage element when a read or write access of the peripheral circuit is initiated and the memory address space of a second peripheral board is the first addressed section such that data is selectively coupled between the peripheral circuit and the peripheral data bus in a width format that depends upon the data feedback signal.

18. The memory bus interface as recited in claim 17 wherein the buffer circuit is a bi-directional buffer circuit.

19. The memory bus interface as recited in claim 17 wherein the buffer circuit includes tri-state output lines.

20. The memory bus interface as recited in claim 17 wherein the data storage element includes tri-state output lines.

21. The memory bus interface as recited in claim 17 wherein the data format controller provides a first control signal to the data storage element that causes the data storage element to store a first data byte provided at the plurality of data lines of the peripheral circuit during a first clock cycle of a memory read operation, and wherein the data format controller provides a second control signal to the buffer circuit that causes a second data byte provided at the plurality of data lines of the peripheral circuit to propagate to the first set of lines of the peripheral data bus during a subsequent clock cycle of the memory read operation.

22. The memory bus interface as recited in claim 21 wherein the first control signal is provided to the data storage element and wherein the second control signal is provided to the buffer circuit when the data feedback signal indicates a first data format having a width of two data bytes.

23. The memory bus interface as recited in claim 22 wherein the data format controller provides a third control signal to the buffer circuit if the data feedback signal indicates a second data format having a width of one data byte, wherein the third control signal causes a third data byte provided at the plurality of data lines of the peripheral circuit to propagate through the buffer circuit to the first set of lines of the peripheral data bus.

24. The memory bus interface as recited in claim 21 wherein the first and second data bytes are provided to the peripheral data bus during the subsequent clock cycle.

25. The memory bus interface as recited in claim 21 wherein the data format controller controls a lowest order address bit of the peripheral circuit such that the lowest order address bit has a first logical state during the first clock cycle and such that the lowest order address bit is complemented during the subsequent clock cycle.

26. The memory bus interface as recited in claim 17 wherein the data format controller controls a lowest order address bit of the peripheral circuit.

27. The memory bus interface as recited in claim 17 wherein the peripheral circuit is a small computer systems interface.

28. The memory bus interface as recited in claim 17 wherein the data format controller provides a first control signal to the data storage element that causes the data storage element to store a first data byte provided at the second set of lines of the peripheral data bus during a first clock cycle of a memory write operation, and wherein the data format controller provides a second control signal to the buffer circuit that causes a second data byte provided at the first set of lines of the peripheral data bus to propagate to the plurality of data lines of the peripheral circuit during the first clock cycle, and wherein the first data byte is provided from the data storage element to the plurality of data lines of the peripheral circuit during a subsequent clock cycle of the memory write operation.

29. The memory bus interface as recited in claim 28 wherein the first control signal is provided to the data storage element and wherein the second control signal is provided to the buffer circuit when the data feedback signal indicates a first data format having a width of two data bytes.

30. The memory bus interface as recited in claim 29 wherein the data format controller provides a third control signal to the buffer circuit if the data feedback signal indicates a second data format having a width of one data byte, wherein the third control signal causes a third data byte provided at the first set of lines of the peripheral data bus to propagate through the buffer circuit to the plurality of data lines of the peripheral circuit.

31. The memory bus interface as recited in claim 28 wherein an output of the buffer circuit is disabled during the subsequent clock cycle.

32. The memory bus interface as recited in claim 28 wherein the data format controller controls a lowest order address bit of the peripheral circuit such that the lowest order address bit has a first logical state during the first clock cycle and such that the lowest order address bit is complemented during the subsequent clock cycle.

33. A method for interfacing a first peripheral board to a computer motherboard having a plurality of expansion slots for connecting to a plurality of peripheral boards, the expansion boards being interfaced to a bus system having a memory address space divided into a plurality of separately-addressed sections, the first peripheral board having a memory address space corresponding to a first addressed section and being coupled to a peripheral data bus of the computer motherboard, the method comprising the steps of:

monitoring a data feedback signal generated by a peripheral board, the signals being indicative of a data width format and a memory address space of the peripheral board;

if the data feedback signal indicates the memory address space of a second peripheral board is the first addressed section and a first data width format, coupling a first data byte between the peripheral data bus and the peripheral circuit via a first set of lines of the peripheral data bus; and if the data feedback signal indicates the memory address space of a second peripheral board is the first addressed section and a second data width format:

storing a second data byte coupled between the peripheral data bus and the peripheral circuit via a second set of lines of the peripheral data bus in a storage element;

coupling a third data byte between the peripheral data bus and the peripheral circuit via the first set of lines of the peripheral data bus; and coupling the second data byte stored in the storage element between the peripheral data bus and the peripheral circuit.

34. The method for interfacing a peripheral board with a computer motherboard as recited in claim 33 wherein the first data width format is eight bits wide and wherein the second data width format is sixteen bits wide.

35. The method for interfacing a peripheral board with a computer motherboard as recited in claim 33 wherein the third data byte is provided to the peripheral circuit during a first clock cycle and wherein the second data byte is provided to the peripheral circuit during a subsequent clock cycle.

36. The method for interfacing a peripheral board with a computer motherboard as recited in claim 33 comprising the further steps of:

driving a lowest order addressing bit of the peripheral circuit to a first logical state when providing the third data byte to the peripheral circuit; and driving the lowest order addressing bit of the peripheral circuit to a complemented logical state when providing the second data byte to the peripheral circuit.

37. A method for interfacing a first peripheral board to a computer motherboard having a plurality of expansion slots for connecting to a plurality of peripheral boards, the expansion boards being interfaced to a bus system having a memory address space divided into a plurality of separately-addressed sections, the first peripheral board having a memory address space corresponding to a first addressed section and being coupled to a peripheral data bus of the computer motherboard, the method comprising the steps of:

monitoring a data feedback signal generated by a peripheral board, the signal being indicative of a data width format and a memory space of the peripheral board;

if the data feedback signal indicates the memory address space of a second peripheral board is the first addressed section and a first data width format, coupling a first data byte between the peripheral data bus and the peripheral circuit via a first set of lines of the peripheral data bus; and if the data feedback signal indicates the memory address space of a second peripheral board is the first addressed section and a second data width format:

storing a second data byte from the peripheral circuit in a storage element;

coupling a third data byte to the first set of lines of the peripheral data bus from the peripheral circuit; and coupling the second data byte stored in the storage element to a second set of lines of the peripheral data bus at the same time when the third data byte is provided to the first set of lines of the peripheral data bus.

38. The method for interfacing a peripheral board with a computer motherboard as recited in claim 37 wherein the first data width format is eight bits wide and wherein the second data width format is sixteen bits wide.

39. The method for interfacing a peripheral board with a computer motherboard as recited in claim 37 wherein the second data byte is stored in the storage element during a first clock cycle and wherein the third data byte is provided to the first set of lines of the peripheral data bus during a subsequent clock cycle.

40. The method for interfacing a peripheral board with a computer motherboard as recited in claim 37 comprising the further steps of:

driving a lowest order addressing bit of the peripheral circuit to a first logical state when storing the second data byte in the storage element; and driving the lowest order addressing bit of the peripheral circuit to a complemented logical state when providing the third data byte to the first set of lines of the peripheral data bus.

41. A first peripheral board configured to be connected to a first expansion slot of a computer motherboard having a plurality of expansion slots for connecting a plurality of peripheral boards, the expansion slots being interfaced to a bus system having a memory address space divided into a plurality of separately-addressed sections, the first peripheral board having a memory address corresponding to a first addressed section and coupling a peripheral data bus to the first peripheral board, the first peripheral board comprising:

a peripheral circuit;

a buffer circuit coupled to a plurality of data lines of the peripheral circuit integral to the first peripheral board and to a first set of lines of the peripheral data bus, the buffer circuit selectively coupling data between the plurality of data lines of the peripheral circuit and the first set of lines of the peripheral data bus;

a data storage element coupled to the plurality of data lines of the peripheral circuit and a second set of lines of the peripheral data bus, the data storage element selectively coupling data between the plurality of data lines of the peripheral circuit and the second set of lines of the peripheral data bus; and a data format controller coupled to receive and monitor a data feedback signal generated by a peripheral board, the signal being indicative of a data width format and a memory space of the peripheral board, wherein the data format controller provides control signals to the buffer circuit and to the data storage element when a read or write access of the peripheral circuit is initiated and the memory address of a second peripheral board is the first addressed section such that data is selectively coupled between the peripheral circuit and the peripheral data bus in the same width format as the data width format of the second peripheral board.

42. The peripheral board as recited in claim 41 wherein the peripheral circuit is a small computer systems interface controller.

43. The peripheral board as recited in claim 42 further comprising an EPROM circuit having a plurality of data output lines coupled to the buffer circuit and to the plurality of data lines of the peripheral circuit.

44. A computer system comprising:

a computer motherboard having a plurality of expansion slots for connecting to a plurality of peripheral boards, the expansion slots being interfaced to a bus system having a memory address space divided into a plurality of separately-addressed sections;

a first peripheral board of the plurality of peripheral boards connected to a first expansion slot of the plurality of expansion slots, the first peripheral board having a memory address space corresponding to a first addressed section and coupling a peripheral data bus to the first peripheral board;

a memory bus interface coupled to the first peripheral board and including:

a buffer circuit coupled to a plurality of data lines of a peripheral circuit integral to the first peripheral board and to a first set of lines of the peripheral data bus to selectively communicate data between the plurality of data lines of the peripheral circuit and the first set of lines of the peripheral data bus;

a data storage element coupled to the plurality of data lines of the peripheral circuit and to a second set of lines of the peripheral data bus to selectively store data and communicate stored data between the plurality of data lines of the peripheral circuit and the second set of lines of the peripheral data bus; and a data format controller coupled to receive and monitor a data feedback signal generated by peripheral boards other than the first peripheral board of the plurality of peripheral boards, the signal being indicative of a data width format and operating memory space of the peripheral board, wherein the data format controller provides control signals to the buffer circuit and to the data storage element when a read or write access of the peripheral circuit is initiated and the memory address space of a second peripheral board is the first addressed section such that data is selectively coupled between the peripheral circuit and the peripheral data bus in the same width format as the data width format of the second peripheral board.

45. The computer system according to claim 44 wherein the data format controller monitors a data feedback signal generated by a peripheral board, the data feedback signal being:

a data width format indicator signal MEMCS16 asserted from a decode of selected bits of a peripheral address bus;

the selected bits of the peripheral data bus being further indicative of whether the memory address space of a second peripheral board is the first addressed section.

46. The computer system according to claim 44 wherein the data format controller monitors a data feedback signal generated by a peripheral board, the data feedback signal being:

a data width format indicator signal SBHE and a bits of a peripheral address bus; and selected bits of the peripheral data bus being indicative of whether the memory address space of a second peripheral board is the first addressed section.

\* \* \* \* \*

UNITED STATES PATENT AND TRADEMARK OFFICE
CERTIFICATE OF CORRECTION

PATENT NO.    : 5,553,244
DATED         : September 3, 1996
INVENTOR(S)   : Thomas M. Norcross and William V. Miller It is certified that error appears in the above-identified patent and that said Letters Patent is hereby corrected as shown below:

Column 8,
Line 42, delete "I/O." and insert -- I/O --.

Signed and Sealed this

Twenty-seventh Day of August, 2002

Attest:

JAMES E. ROGAN
Attesting Officer        Director of the United States Patent and Trademark Office